US006424344B1

(12) United States Patent
Lee

(10) Patent No.: US 6,424,344 B1
(45) Date of Patent: Jul. 23, 2002

(54) APPARATUS FOR PROVIDING A VISUAL NAVIGATION INTERFACE

(75) Inventor: Choong Hwan Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/475,050

(22) Filed: Dec. 30, 1999

(30) Foreign Application Priority Data

Jun. 19, 1999 (KR) ............................................ 99-23134

(51) Int. Cl.[7] .............................................. G06T 15/00
(52) U.S. Cl. ...................................................... 345/419
(58) Field of Search ................................ 345/419, 420, 345/426, 473, 474, 475

(56) References Cited

U.S. PATENT DOCUMENTS

| 5,625,760 A | 4/1997 | Fujita ........................... 395/124 |
| 5,760,781 A | 6/1998 | Kaufman et al. ............ 345/424 |
| 5,760,783 A | 6/1998 | Migdal et al. ............... 345/430 |
| 6,147,692 A | * 11/2000 | Shaw et al. .................. 345/433 |

OTHER PUBLICATIONS

Marc Levoy, Efficient Ray Tracing of Volume Data, Jul. 1990, pp. 245–261.
Boon–Lock Yeo et al., Volume Rendering of DCT–Based Compressed 3D Dcalar Data, Mar. 1995, pp. 29–43.
Frank Dachille et al., High–Quality Volume Rendering Using Texture Mapping Hardware, 1998, pp. 1–8.

* cited by examiner

Primary Examiner—Phu K. Nguyen
(74) Attorney, Agent, or Firm—Jacobson Holman, PLLC

(57) ABSTRACT

An apparatus provides a visualized navigation interface by real-time volume rendering volume data. In addition, the apparatus visualizes internal information of a large-scale 3-dimensional volume data which are widely used in various fields such as medical images, computer graphics, virtual reality and scientific data visualization. Thereafter, the interaction with a user is possible through the real-time volume rendering and visual navigation interface for the large amount of volume data that the conventional volume rendering apparatus cannot process. Further, the present invention can provide excellent images providing surface and internal information of an object through the real-time interaction with the user. Finally, since the real-time volume rendering apparatus in accordance with the present invention can generate the image capable of being used in external output devices such as a stereo display device and a head mount device, the present invention can obtain more realistic internal information of the volume data so that it is possible to perform an advanced diagnosis and prediction for medical, weather and geological data.

4 Claims, 9 Drawing Sheets

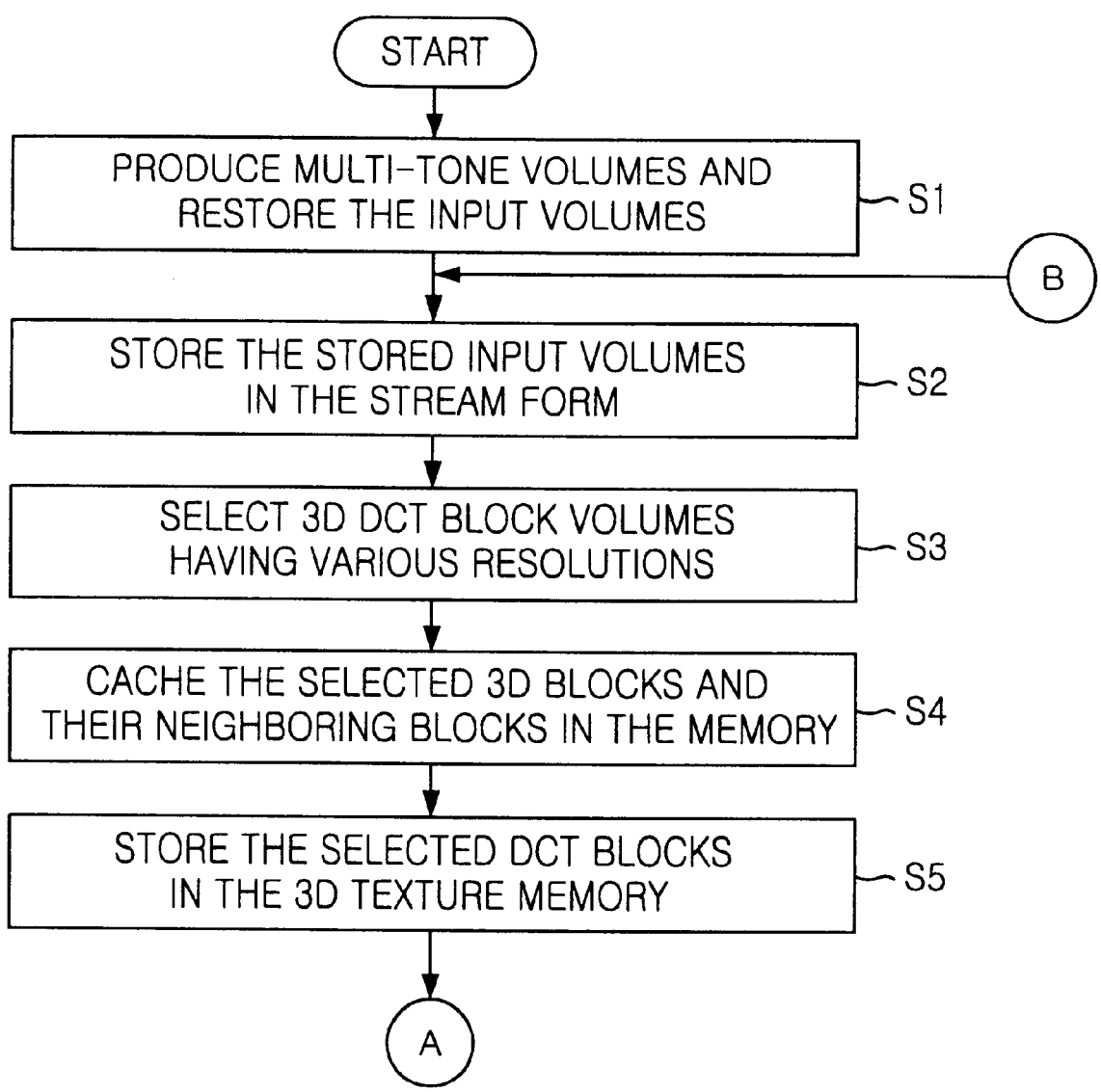

APPARATUS FOR PROVIDING A VISUAL NAVIGATION INTERFACE

FIELD OF THE INVENTION

The present invention relates to an apparatus for providing a visual navigation interface through the use of a real-time volume rendering of large-scale volume data.

DESCRIPTION OF THE PRIOR ART

The present invention generates 3D images through the use of a 3-dimensional (3D) graphics technology based on volume data used in various fields such as medical images, computer graphics, virtual reality and scientific data visualization. The 3D images are used in a diagnosis, a medical simulation and so on in the case when using the medical data. In the computer graphics and virtual reality fields, the images are used in the modeling of complex objects, the visualization of a natural phenomenon, or the like.

In the event of the scientific volume data, the images are also used in a weather forecast or an oceanic and geological observation.

The volume data used in the above arts are becoming more accurate by the development of measure equipment, calculation methods and the like and are generated in the large-scaled form.

Accordingly, there have been proposed various schemes and devices for generating the 3D images based on the volume data.

Among them, there is a scheme which generates polygon data, treatable in conventional graphics display devices, from the volume data and produces the images by using the conventional graphics devices from the polygon data. There is a scheme, i.e., a volume rendering scheme, which generates the images by synthesizing internal values of the volume data along a straight line penetrating the volume data on a plain displaying the 3D images, without generating the polygon data.

The above volume rendering can obtain a more realistic image compared to the former scheme and display an internal structure of an object together with its surface. However, since this volume rendering cannot be used in the conventional graphics apparatus, there is a disadvantage that the rendering time is long.

Therefore, there have been developed various schemes and apparatus so as to reduce the rendering time. The present invention is used in the same manner as the apparatus, employing a 3D texture memory, among apparatus for performing real-time volume rendering in its usage co-operate. But, unlike to the conventional apparatus, the present invention has a different scheme for constituting the texture memory and co-operates with a compression/decompression device.

The aforementioned real-time volume rendering apparatus are sufficiently adopted to their applications in the case of a relatively small amount of volume data. However, they cannot provide the performance required to visualize a large-scale volume data recently being developed.

Therefore, nowadays, there is developing techniques for compressing the large-scale volume data into an amount of data that the existing apparatus can process and performing the rendering by using the compressed volume data, and, among the techniques, there are vector quantization, sub-band coding, wavelet, DCT and the like.

SUMMARY OF THE INVENTION

It is, therefore, a primary object of the present invention to provide an apparatus for compressing a large amount of volume data that the existing volume rendering accelerating device and graphic display device cannot process, storing the compressed volume data and variably using the volume data in the rendering according to various conditions such as real-time volume rendering, the specific resolution of one data within the volumes in an image coordinate plane, a location at which an image is generated and a distance between volume data.

In accordance with the present invention, there is provided an apparatus for performing a real-time rendering capable of interacting with a user to visualize internal information of a large-scale 3 dimensional (3D) volume data, comprising: a large capacity storing device for generating multi-resolution models by filtering the large-scale volume data, compressing the generated multi-resolution models and storing the compressed models; a memory for caching block volume data for a portion of all of the volumes which are required in the rendering; and a 3D texturing system for generating a 3D rendered image with the volume compression and decompression device through the memory.

Further, the present invention provides an interfacing method and an apparatus capable of making a user accomplish a visual navigation by real-time rendering compressed 3D DCT volume data through the co-operation with a 3D texture memory and a device employing a compression/decompression scheme which extends DCT to a 3 dimension and applies the extended 3D DCT to the volume data.

BRIEF DESCRIPTION OF THE DRAWINGS

The foregoing and other objects, features and advantages of the present invention will become apparent from the following detailed description of preferred embodiments of the invention with reference to the accompanying drawings, in which:

FIGS. 8A and 8B depict a flow chart representing a process through which the usage of the volume blocks having variable resolution are selected from the multi-resolution volumes and used in the volume rendering apparatus in accordance with the present invention.

DETAILED DESCRIPTION OF THE PREFERRED EMBODIMENTS

Hereinafter, the present invention will be explained in detail with reference to the accompanying drawings.

Figure 1:
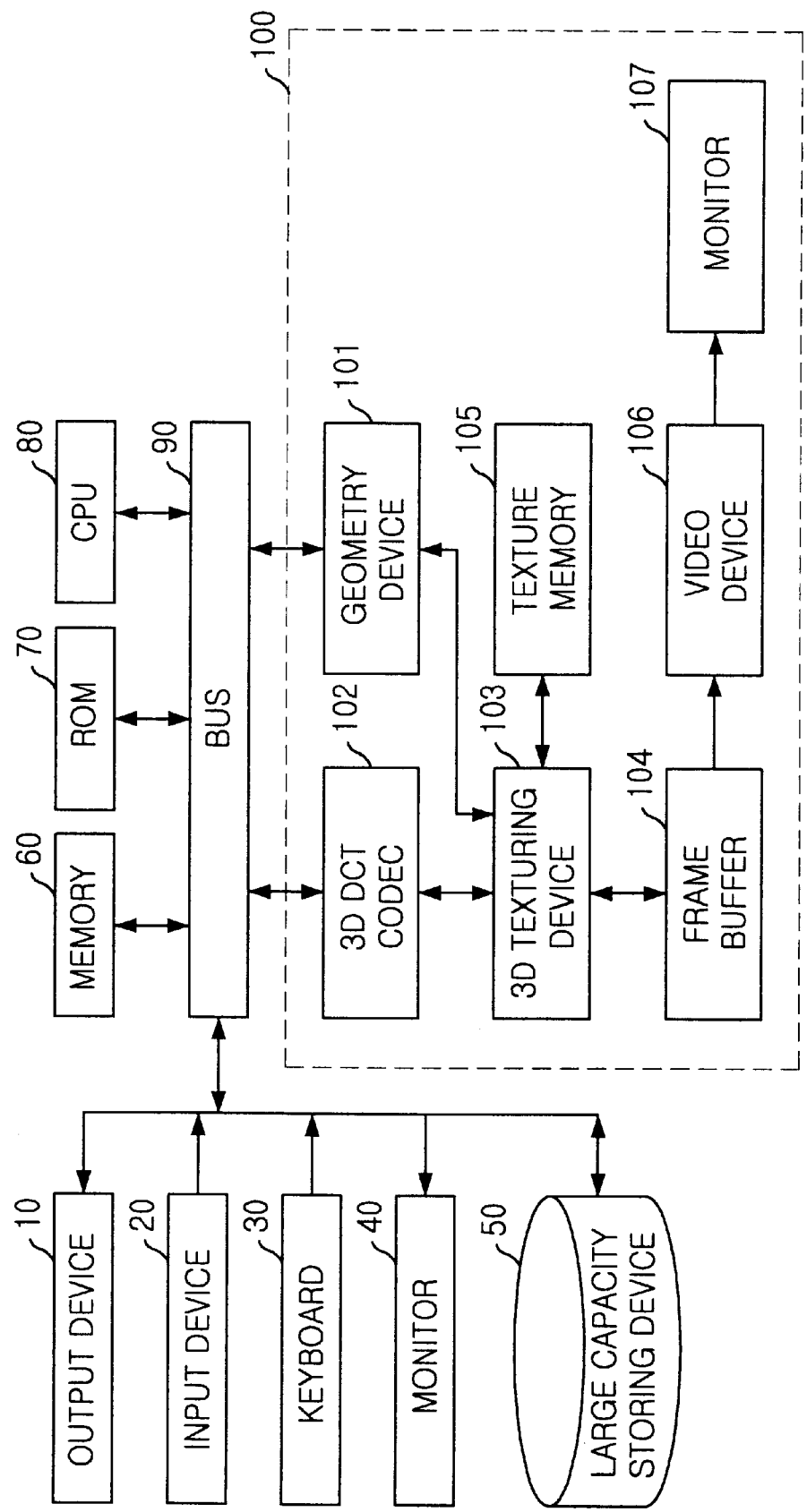
FIG. 1 represents a block diagram of a real-time volume rendering apparatus employing a volume compression/decompression device and a 3-dimensional texture memory in accordance with the present invention.

Referring to FIG. 1, there is illustrated a block diagram of a real-time volume rendering apparatus employing a volume compression/decompression device and a 3-dimensional (3D) texture memory. In FIG. 1, there are depicted the real-time volume rendering apparatus 100 employing a volume compression/decompression device and a 3D texturing system for generating a 3D rendered image of a volume, and a subsystem of a conventional graphics system.

The apparatus in FIG. 1 comprises a large capacity storing device 50 for constituting a multi-resolution model by filtering large-scale volume data, compressing and storing it, a memory 60 for caching block volume data corresponding to a portion of all volumes which takes part in the rendering, a 3D discrete cosine transform (DCT) codec 102 for compressing/decompressing the data provided from the memory 60 into the 3D DCT form, a 3D texturing device 103 for storing the decompressed block volume data in a texture memory 105 and producing the rendered image by using image condition data and geometric data provided from a geometry device 101 in the volume rendering apparatus 100, and a frame buffer 104 for synthesizing and storing the images generated by the 3D texturing to thereby display them. The apparatus includes an input device 10, an output device 20, a keyboard 40, monitors 40 and 107, a ROM 70, a CPU 80 and a bus 90.

Figure 2:
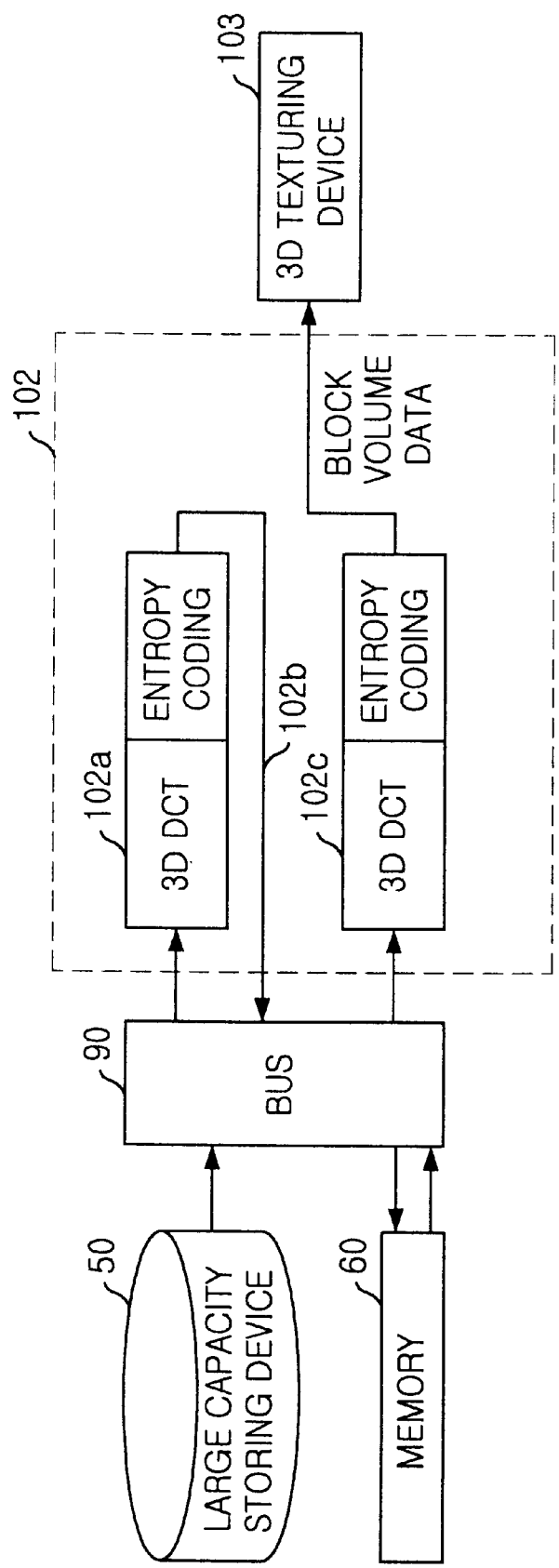
FIG. 2 illustrates a block diagram of a volume data 3-dimensional DCT compression/decompression apparatus in accordance with the present invention.

Referring to FIG. 2, there is shown a detailed block diagram of the 3D DCT codec 102.

The present invention employs a 3D DCT method so as to compress and store the volume data since the DCT method has a high compression rate and the 3D texturing device, which is used as a next stage of the compression device to perform the real-time rendering, can easily obtain the textured image when it uses the block data of the 3D form.

Since the compression and decompression are performed on a n x n x n block basis through the 3D DCT method, the present invention can perform the real-time rendering for the large-scale volume data by applying the 3D DCT method to the 3D texturing device.

This is an important characteristic of the present invention.

In the meantime, the multi-resolution volume data stored in the large capacity storing device are divided into the block basis by a DCT encoder 102a and then restored in the storing device as compressed data 102b of the stream form.

The stored stream data 102b are cached in the memory 60 according to the conditions such as a sub-volume of the rendered image and the like, retrieved as block data of the block basis by a decoding device 102c and then stored in the texture memory 60 by the texturing device 103.

The texturing device 103 produces a volume image by using the stored volume data of the block basis to thereby using the volume image so as to construct a whole image.

Figure 3:
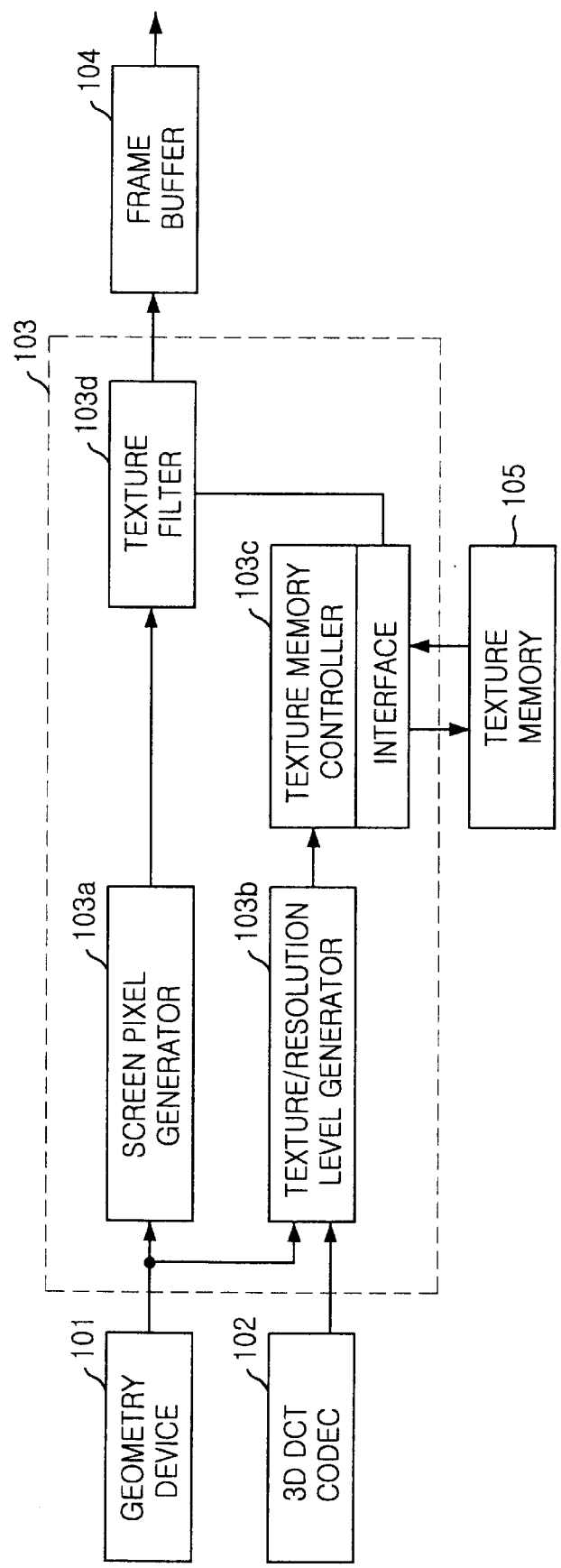
FIG. 3 depicts a block diagram of a 3-dimensional texture memory in accordance with the present invention.

Referring to FIG. 3, there is illustrated a detailed block diagram of the texturing device 103.

A screen pixel generator 103a produces geometric information on an image to be used for the texturing by using display information for sub-volumes and coordinates of the image provided from the geometry device 101.

A texture/resolution level generator 103b stores the decompressed block volume data from the 3D DCT codec 102 by using addresses produced by a texture memory controller 103c, generates texture coordinates corresponding to the block volume data by using the image coordinate information used in the screen pixel generator 103a and provides the texture coordinates to the texture memory controller 103c.

Meanwhile, a texture filter 103d performs an interpolation based on three coordinate values so as to produce values accurately corresponding to the pixel values given to the image coordinates for the data of the texture memory.

The data mapped to the image in the texture memory are stored in the frame buffer 104 which performs synthesis, lookup table mapping and coloring processes for the data to thereby produce a final image to be displayed.

Figure 4:
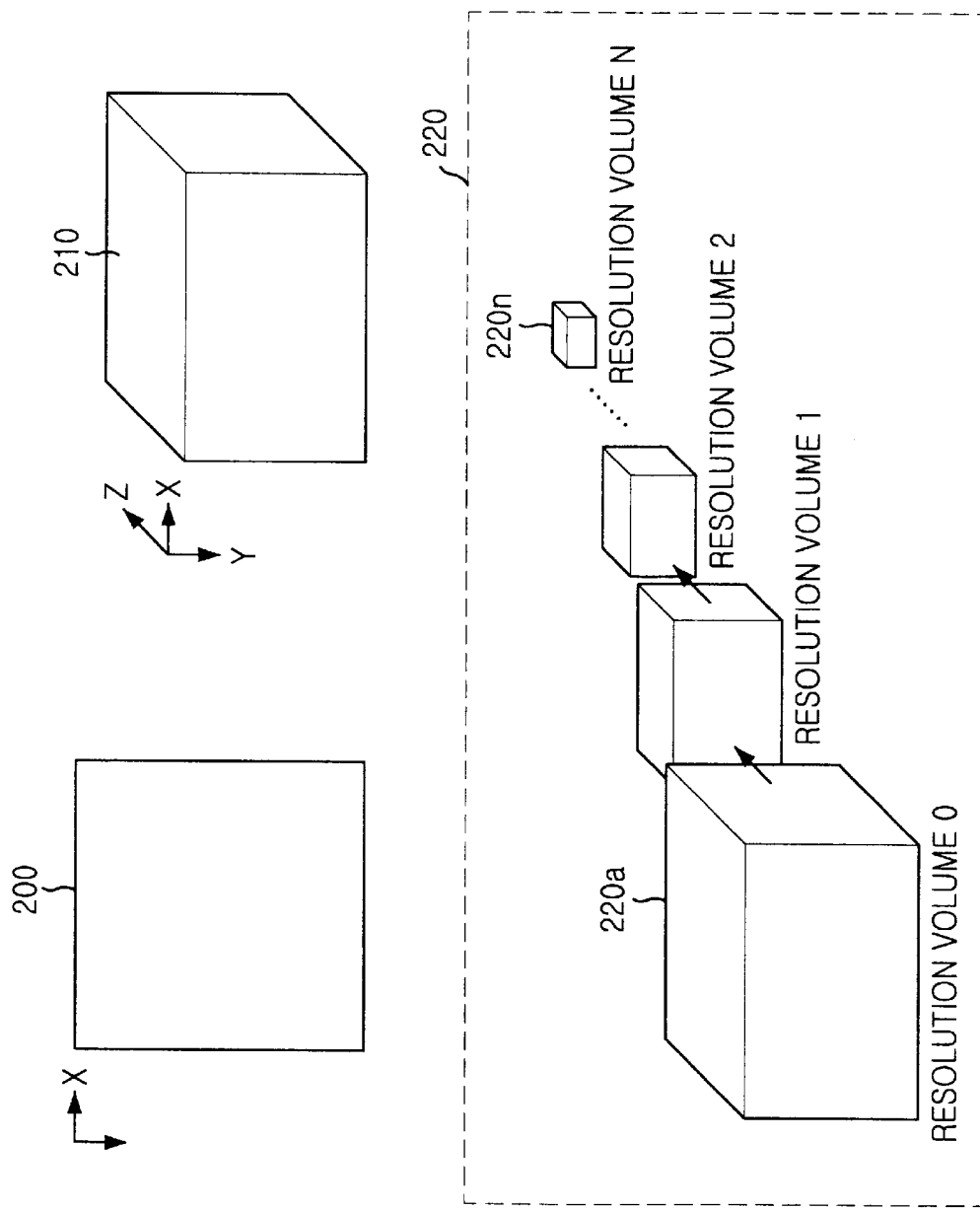
FIG. 4 is a multi-resolution volume diagram determined by the filtering in accordance with the present invention.

Referring to FIG. 4, there is provided a conceptional diagram of the multi-resolution volume data to provide a visual navigation interface in the real-time volume rendering apparatus supporting the Compression and decompression in accordance with the present invention described above.

In FIG. 4, there is shown the 3D volume data 210 used as an input which are distinguished from 2D data such as an image 200.

This figure shows a process 220 in which the input volume data are divided into volume data having low resolutions through a filtering process.

Figure 5:
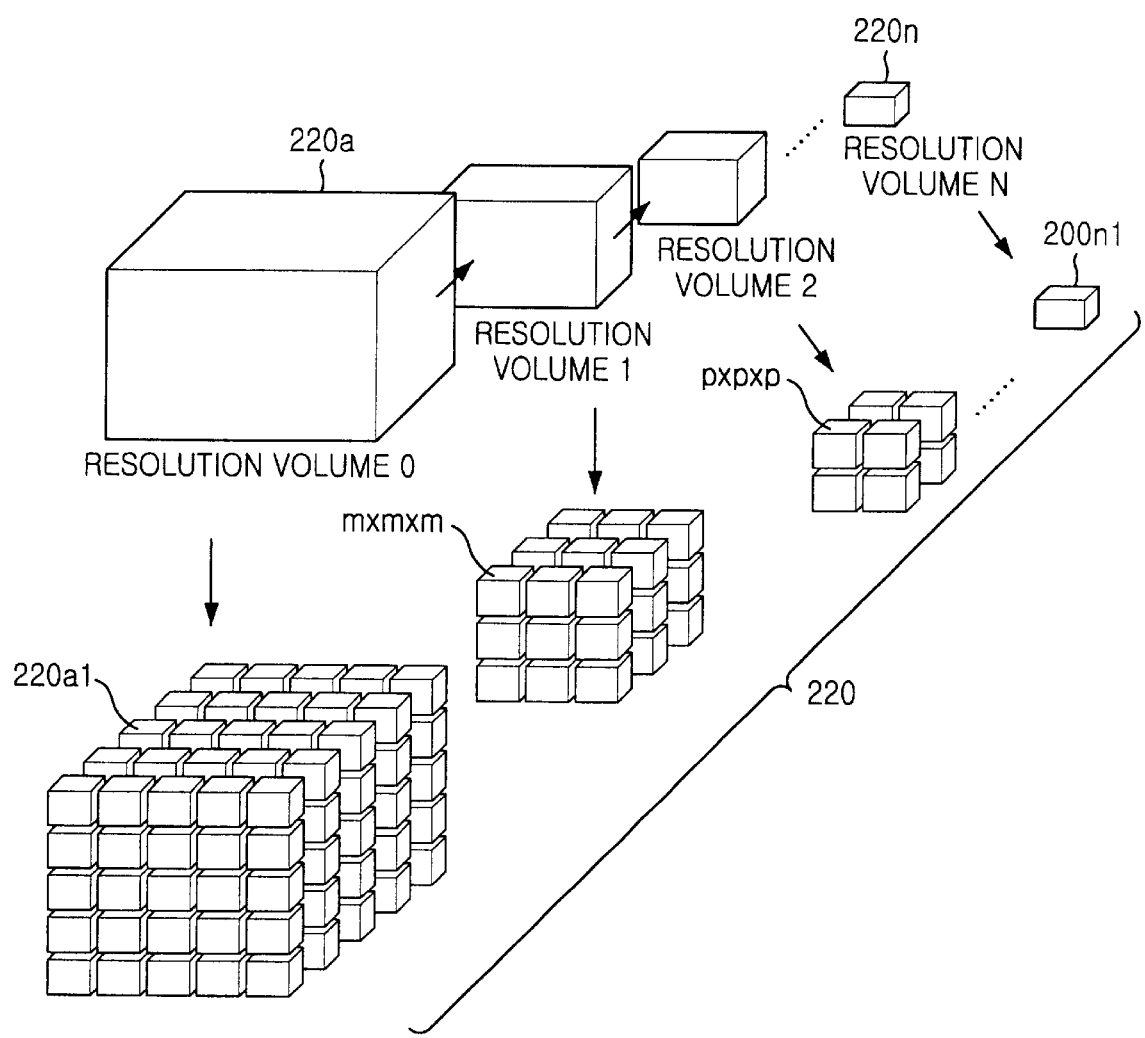
FIG. 5 shows a DCT block diagram for each volume in accordance with the present invention.

Meanwhile, instead of being used in the rendering, as shown in FIG. 5, the multi-resolution volumes generated by the above processes are divided into an appropriate number of 3D blocks according to their resolutions so as to accomplish the 3D DCT compression. And then, the 3D blocks are compressed and stored or cached in the memory.

Figure 6:
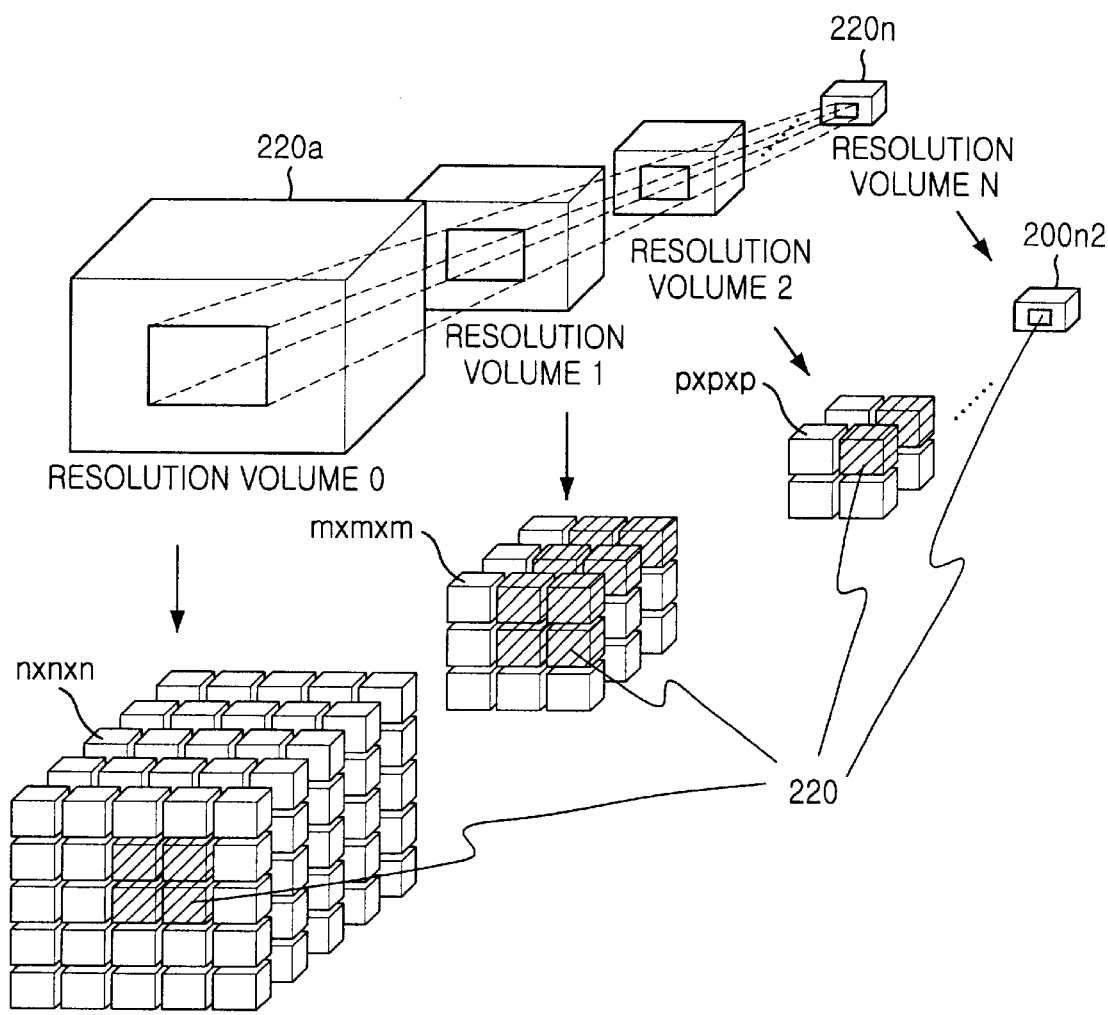
FIG. 6 provides a 3-dimensional DCT block diagram selected among the DCT blocks of the multi-resolution volumes for the rendering during a navigation visualized through the volume rendering in accordance with the present invention.

Also, as illustrated in FIG. 6, in accordance with the present invention, all of the block volumes are not used in the rendering and the volumes corresponding to blocks to be displayed in a current image are only stored in the memory 60 and the texture memory 105.

DCT block volumes 220 selected to constitute a volume rendering image represent the block volumes selected above.

As a result, the apparatus in accordance with the present invention can render the large-scale volume data and provide the visual navigation interface in a graphics device having a conventional storing device and a memory capacity.

The block volume data 220 in FIG. 5 are practically stored in the compressed stream form instead of being stored in a 3D array form as shown in the drawing. The 3D texture memory only stores the blocks to be used in the rendering in the 3D array form after decompressing them.

Figure 7:
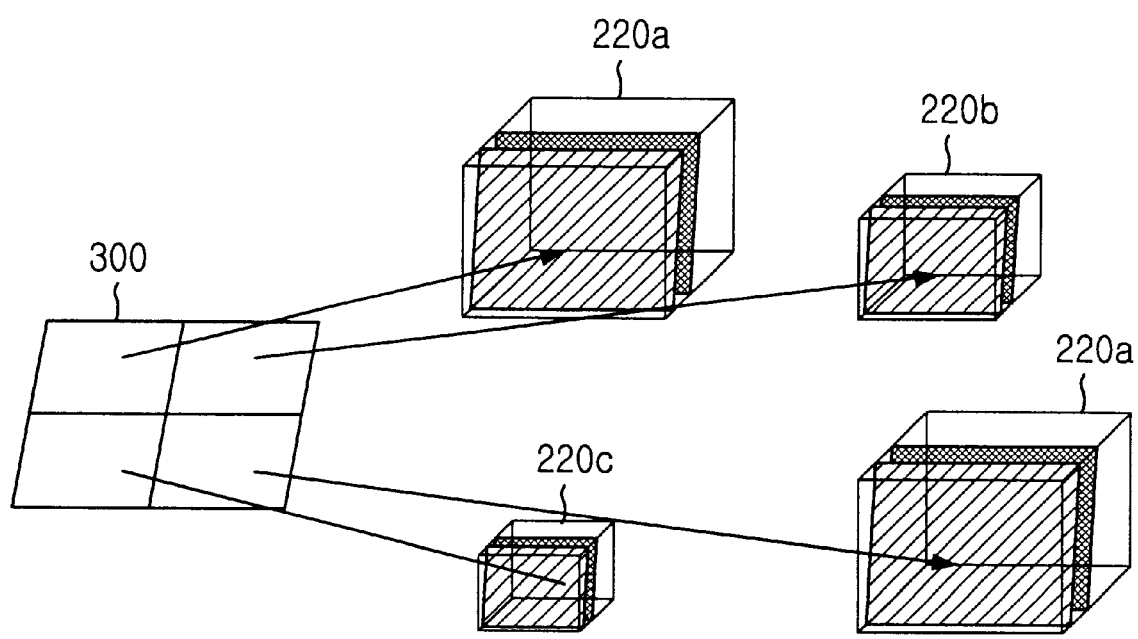
FIG. 7 represents a conditional diagram of an image display device during the volume rendering in accordance with the present invention.

Referring to FIG. 7, the 3D texturing device divides and renders an image 300 of the multi-resolution block volumes stored in the texture memory during the visual navigation interface performed by the real-time volume rendering. Further, as shown in FIG. 7, the device uses volumes having different resolutions according to the distances between an observer and the block volumes and the importance of internal information of the current block.

Through the above processes, during the visual navigation, unnecessary portions can be prevented from being rendered and, thereafter, the real-time rendered image can be displayed.

Figure 8B:
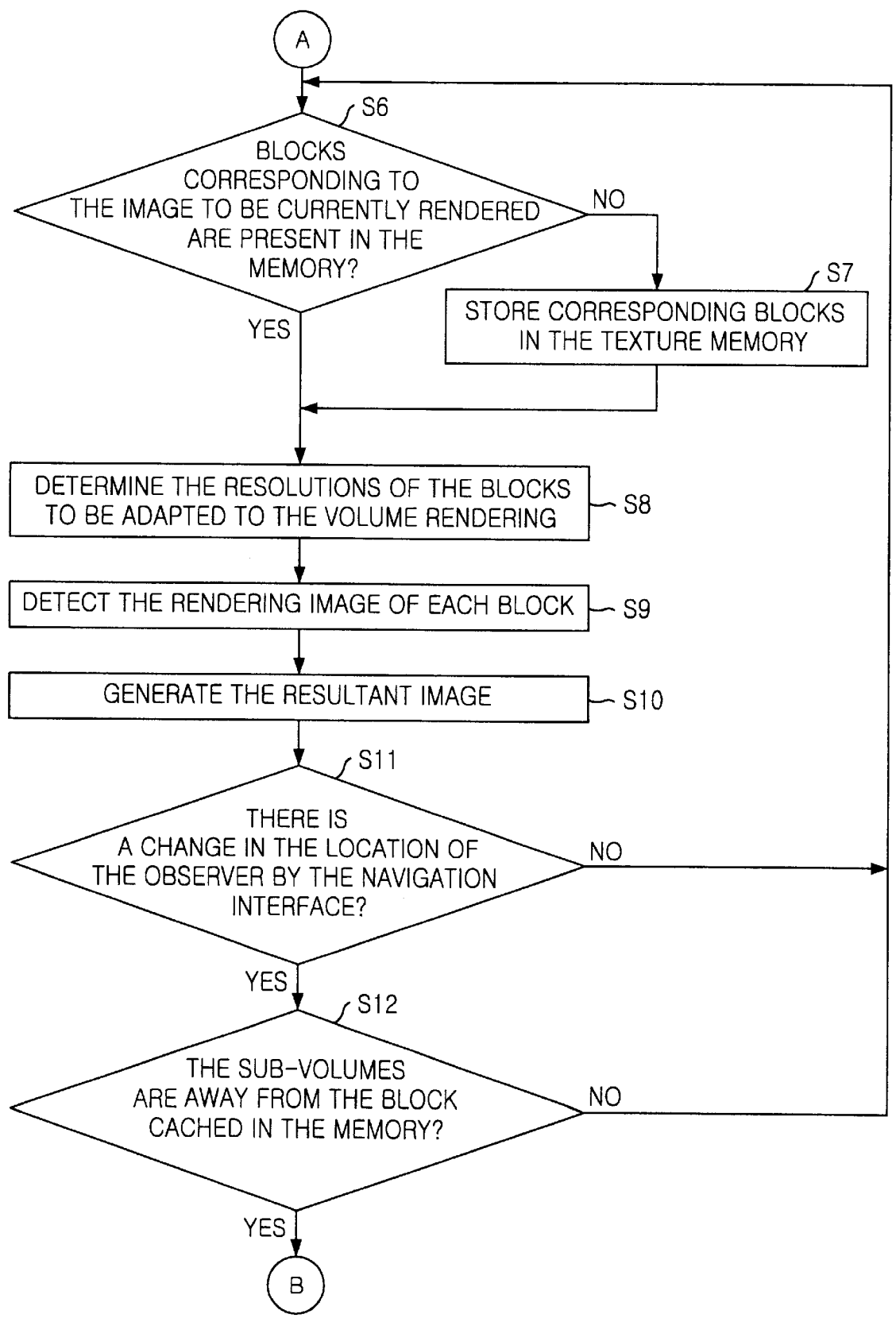

Referring to FIGS. 8A and 8B, there is illustrated a flow chart representing a method for providing the visual navigation interface by using the real-time volume rendering apparatus as shown above.

In step S1, the present invention reads out large-scale input volumes from an external data storage device; produces multi-resolution volumes by filtering the input volumes; and then restores the input volumes in the external data storage device.

In step S2, a 3D DCT compression device stores the stored input volumes in the data storage device in the stream form.

In step S3, 3D DCT block volumes having various resolutions are selected from the stored input volumes according to the conditions such as the location of an observer of an image and the size of sub-volumes.

In step S4, the selected 3D DCT blocks and their neighboring blocks are cached in the memory.

Then, in step S5, the selected DCT blocks are reconstructed by a 3D DCT decompression device and stored in the 3D texture memory.

In step S6, there is determined whether blocks corresponding to the image to be currently rendered are present in the memory. As a result, if there do not exist the blocks in the memory, the 3D DCT decompression device reconstructs corresponding blocks and stores them in the texture memory in step S7.

On the other hand, if there exist the blocks in the memory, in step S8, the resolutions of the blocks to be adapted to the volume rendering are determined according to the conditions such as the location of the observer of the image and the size of the sub-volumes.

In step S9, the rendering image of each block is detected by the 3D texturing for the selected blocks. After the image detection, the resultant image is generated through the synthesis of each image obtained above in step S10. In step S11, it is determined whether there is a change in the location of the observer by the navigation interface. As a result, if there is no change, the procedure returns to the step S6 which determines whether there exist the blocks corresponding to the image to be rendered in the texture memory. If there is a change, it is determined whether the sub-volumes are away from the blocks cached in the memory in step S12. If the sub-volumes are not away, in the step S6, it is determined whether there exist corresponding blocks in the texture memory. On the other hand, if the sub-volumes are away, the procedure is repeated from the step S3 selecting the 3D DCT block volumes having various resolutions according to the conditions such as the location of the observer of the image and the size of the sub-volumes based on the stored input volumes.

As illustrated above, the present invention can obtain following effects.

Firstly, the interaction with a user is possible through the real-time volume rendering and visual navigation interface for the large amount of volume data that the conventional volume rendering apparatus cannot process.

The reason is that the volume rendering apparatus in accordance with the present invention first stores volumes after compressing them through the use of the DCT compression device, only decompresses a portion of blocks within volumes required in the rendering and renders the decompressed blocks by using the 3D texture memory device which is a real-time rendering device.

Secondly, since the present invention can provide the volume navigation interface device visualized by the volume render image, compared to the conventional method only displaying the surface of an object by using conventional polygon data, the present invention can provide excellent images providing surface and internal information of an object through the real-time interaction with the user.

Thirdly, since the real-time volume rendering apparatus in accordance with the present invention can generate the image capable of being used in external output devices such as a stereo display device and a head mount device (HMD) which are used in the conventional graphics and virtual reality fields, in the case of being used with the existing display devices, the present invention can obtain more realistic internal information of the volume data so that it is possible to perform an advanced diagnosis and prediction for medical, weather and geological data.

While the present invention has been described with respect to the particular embodiments, it will be apparent to those skilled in the art that various changes and modifications may be made without departing from the spirit and scope of the invention as defined in the following claims.

What is claimed is:

1. An apparatus for performing a real-time rendering capable of interacting with a user to visualize internal information of a large-scale 3 dimensional (3D) volume data, comprising:
   a large capacity storing device for generating multi-stage models by filtering the large-scale volume data, compressing the generated multi-stage models and storing the compressed models;
   a memory for caching block volume data for a port on of all of the volumes which are required in the rendering; and
   a 3D texturing system for generating a 3D rendered image with the volume compression and decompression device through the memory.

2. The apparatus as recited in claim 1, wherein the 3D texturing system includes:
   a 3D discrete cosine transform(DCT) codec for compressing and decompressing the restored data provided by the memory in the 3D DCT form;

a 3D texture memory for storing the restored block volume data provided from the 3D DCT codec;

a 3D texturing device for obtaining a rendered image by using view-dependent geometric data and image conditional data provided from peripheral devices within a system; and frame buffer for synthesizing and storing the images provided from the 3D texturing device to display them.

3. The apparatus as recited in claim 2, wherein the 3D DCT codec contains:

a 3D block encoder for dividing the multi-stage volume data stored in the large capacity storing device into a multiplicity of blocks and compressing the blocks to store them in the storing device in the stream form; and a 3D block decoder for caching the stored stream data in the memory according to a condition of the rendered image, reproducing the stored stream data to the volume data on the block basis and storing them in the texture memory by using the texturing device.

4. The apparatus as recited in claim 2, wherein the texturing device contains:

a screen pixel generator for producing the textured data on the image used to convert the texture by receiving display information for the coordinates of the image and sub-volumes from a peripheral device;

a texture/resolution level generator for storing the restored block volume data provided from the 3D DCT codec by using appropriate addresses produced from a texture memory controller, generating texture coordinates corresponding to the restored block volume data by using the image coordinate information used at the screen pixel generator and providing the texture coordinates to the texture memory controller;

a texture filter for performing the interpolation by using three coordinates so as to generate accurate values corresponding to the pixel values given to the image coordinates for the data of the texture memory; and a frame buffer for storing the data mapped to the image values provided from the texture memory to thereby display them as a final image after performing synthesis, look-up table mapping and coloring processes therefor.

* * * * *